United States Patent [19]

Jachmann et al.

[11] Patent Number: 5,146,439
[45] Date of Patent: Sep. 8, 1992

[54] RECORDS MANAGEMENT SYSTEM HAVING DICTATION/TRANSCRIPTION CAPABILITY

[75] Inventors: Emil F. Jachmann; Alan F. Sweet, both of Stratford, Conn.

[73] Assignee: Pitney Bowes Inc., Stamford, Conn.

[21] Appl. No.: 293,895

[22] Filed: Jan. 4, 1989

[51] Int. Cl.⁵ .................................................. G11B 27/00
[52] U.S. Cl. .................................... 369/25; 369/29; 364/DIG. 2; 364/963; 364/963.1; 364/943; 364/948.2; 364/918; 364/920; 364/926; 364/922; 364/922.1
[58] Field of Search ... 364/200 MS File, 900 MS File; 369/25-29; 379/75; 395/149, 600

[56] References Cited

U.S. PATENT DOCUMENTS

| | | | |
|---|---|---|---|
| 3,648,249 | 5/1972 | Goldsberry | 364/900 |
| 3,936,805 | 2/1976 | Briaigol et al. | 340/172.5 |
| 4,041,467 | 7/1977 | Cota et al. | 364/900 |
| 4,260,854 | 4/1981 | Kolodny et al. | 179/6.09 |
| 4,272,813 | 6/1981 | Howell et al. | 364/900 |
| 4,301,525 | 11/1981 | Mohammadioun et al. | 369/29 |
| 4,303,998 | 12/1981 | Plunkett, Jr. | 369/29 |
| 4,319,337 | 3/1982 | Sander et al. | 364/900 |
| 4,371,928 | 2/1983 | Barlow et al. | 364/200 |
| 4,375,083 | 2/1983 | Makemchuk | 364/900 |
| 4,430,726 | 2/1984 | Kasday | 364/900 |
| 4,459,049 | 6/1984 | Howell et al. | 400/98 |
| 4,462,085 | 7/1984 | Yamamoto et al. | 364/900 |
| 4,468,751 | 7/1984 | Plunkett, Jr. | 364/900 |
| 4,495,490 | 1/1985 | Hopper et al. | 340/209 |
| 4,539,653 | 9/1985 | Bartlett et al. | 364/900 |
| 4,566,065 | 1/1986 | Toth | 364/300 |
| 4,573,140 | 2/1986 | Szeto | 364/900 |
| 4,591,974 | 5/1986 | Dornbush et al. | 364/200 |
| 4,623,988 | 11/1986 | Paulson et al. | 400/91 |
| 4,627,001 | 12/1986 | Stapleford et al. | 364/513.5 |
| 4,632,578 | 12/1986 | Cuff et al. | 400/91 |
| 4,646,229 | 2/1987 | Boyle | 364/200 |
| 4,817,127 | 3/1989 | Chamberlin et al. | 379/67 |
| 4,878,175 | 10/1989 | Norden-Paul et al. | 364/401 X |
| 4,893,270 | 1/1990 | Beck et al. | 364/900 |
| 4,975,894 | 12/1990 | Jachmann et al. | 369/25 |

OTHER PUBLICATIONS

IBM Technical Disclosure Bulletin, vol. 22, No. 4, Sep. 1979.
Commonly Assigned U.S. patent appl. Ser. No. 175,900; Method and Apparatus for Generation of Reports; E. Jachmann et al.; Mar. 31, 1981.

*Primary Examiner*—Gareth D. Shaw
*Assistant Examiner*—Paul Kulik
*Attorney, Agent, or Firm*—Peter Vrahotes; Melvin J. Scolnick; David E. Pitchenik

[57] ABSTRACT

An integrated records management system having the capability to record and transcribe dictation. The system is particularly useful for the prompt and efficient management of patient's medical records. The system includes a digital dictation sub-system with a number of dictation input units and a number of transcription output units. The dictation system receives dictation jobs corresponding to reports, and particularly medical reports and stores them as voice files for later output for review of transcription. Job records containing information about the dictation jobs is transmitted to a database server which manages and maintains a database of medical records. The transcription output terminals together with word processing stations connected to the data base server form work stations for transcriptionists. When a dictation job is to be transcribed, the database manager combines information in the database with a selected form for the identified report type prior to transcription and when the dictation job is transcribed into that format to form a complete document representing a report, selected portions of that report may be extracted to form a summary report by the system database manager. The system also includes printers for output of reports, a system administrator station, a communications link to other data processing systems, and archival storage.

11 Claims, 7 Drawing Sheets

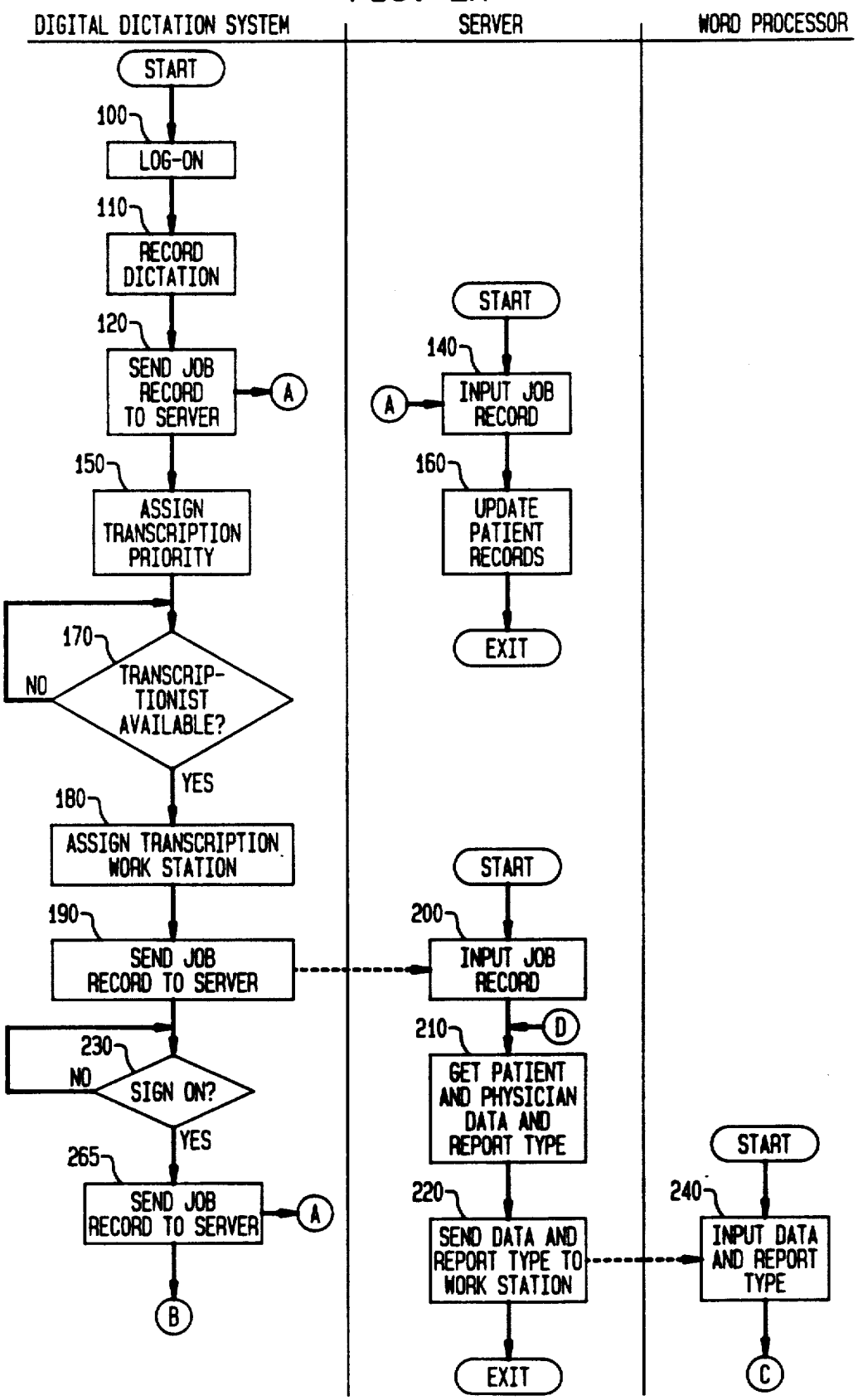

RECORDS MANAGEMENT SYSTEM HAVING DICTATION/TRANSCRIPTION CAPABILITY

BACKGROUND OF THE INVENTION

Records management is a critical function for modern organizations. It is a particularly critical function for hospitals and other acute care health facilities where the Medical Records Departments compile the documentation that represents the complete records of a patient's health care administered at that facility. Accurate and complete records are vital to the operation of a hospital for the following reasons.

1. These records contain information required to provide the appropriate health care for patients.
2. These records contain information required for the prompt and accurate billing the patient, and for the appropriate reimbursement of patients in the hospital by third parties such as insurers and government agencies.
3. Medical records are periodically audited by government agencies to review hospital certification, and are also audited to review physicians' credentials.
4. If a claim of malpractice is brought against either the physician, the hospital, or staff members, information in the patient's medical records can have significant judicial implications.
5. Information in medical records is frequently reviewed to determine patients' demographics to plan the availability of future health care services.

For these reasons the accuracy and completeness of patients' medical records is vital, both to the day to day operation and to the strategic planning of a hospital. They are also critical factors considered in granting and renewing hospital certification. Further, in this era of extensive and continuous "cost containment" efforts, it is vital that hospitals promptly and accurately bill patients and third parties while, at the same time exercising the upmost control over their costs.

One approach to these problems in hospitals and other organizations requiring efficient records management functions has been the use of central dictation systems. Such systems may either be analog, such as the system marketed by the assignee of the present Application under the Trademark Nucleus, or digital such as the systems marketed by the assignee of the present Application under the Trademarks DX 2000 and DX 7000. Such systems allow physicians or other professionals to dictate reports for later transcription by a pool of skilled transcriptionists. Document management systems are known and are commercially available to manage and track records, and some of these systems have been customized for medical records applications. However, most of these systems are highly sophisticated and very expensive and are usually only affordable by larger hospitals (350 or more beds).

Systems such as Nucleus and the DX 2000 have been combined with medical records management systems in order to facilitate the generation of "exception reports" indicating those reports which have not been provided by the responsible physician. Due to the delay which sometimes occurs in transcribing of dictated reports, it will frequently happen that a physician will dictate a report, yet receive and have to respond to a request for the report during the time between dictation and transcription. Since physicians tend to resent these intrusions, central dictation systems such as Nucleus and the DX 2000 have been provided with communications links to medical document management systems to inform the document management system as soon as a report is dictated in order to avoid having the document management system generate an inaccurate reception report indicating that the physician is delinquent.

A related problem faced by hospitals is the prompt and accurate generation of "discharge summaries". In order to generate a bill for a patient's stay in a hospital, a discharge summary containing information such as the primary and secondary diagnosis, procedures performed, length of stay, etc. must be prepared, and reviewed, and signed by the patient's physician. At present, many hospitals employ skilled para-professionals for the purpose of reviewing and summarizing a patient's medical record to prepare such summaries when the patient is discharged.

Thus, it is an object of the present invention to provide an improved, cost effective system for record management; and more particularly, medical record management.

It is still another object of the subject invention to provide a system which will increase the efficiency of the transcription of records, and particularly medical records.

BRIEF SUMMARY OF THE INVENTION

The above objects are achieved and the disadvantages of the prior art are overcome in accordance with the subject invention by means of a system which includes a dictation system for recording a playing back voice files, and a transcription work station for transcription of the voice files played back by the dictation system, the transcription work station including a display. The system also includes a data processing system communicating with the dictation system and the transcription work station. The data processing system maintains data files pertaining to selected subjects, receives information identifying particular voice files as corresponding to particular subjects, controls the work station to control the display so that the voice files are transcribed in predetermined formats corresponding to the identified subjects, and receives the transcribed text and updates the data files pertaining to the identified subjects accordingly.

In another preferred embodiment of the subject invention, the data processing system is further for merging data from the data files relating to the identified subject with the predetermined format so that the merged data is combined with the transcribed information and the data files are updated accordingly.

Thus, it may be seen that the subject invention overcomes the disadvantages of the prior art by advantageously combining record creation and record management functions in a manner not previously considered in the art. Other objects and advantages of the subject invention will be apparent to those skilled in the art from consideration of the Detailed Description set forth below and the attached drawings.

BRIEF DESCRIPTION OF THE DRAWINGS

FIGS. 2A and 2B show a flow chart of the operation and interaction of various components of the system of FIG. 1 during the creation of a report.

DETAILED DESCRIPTION OF PREFERRED EMBODIMENTS

Figure 1:
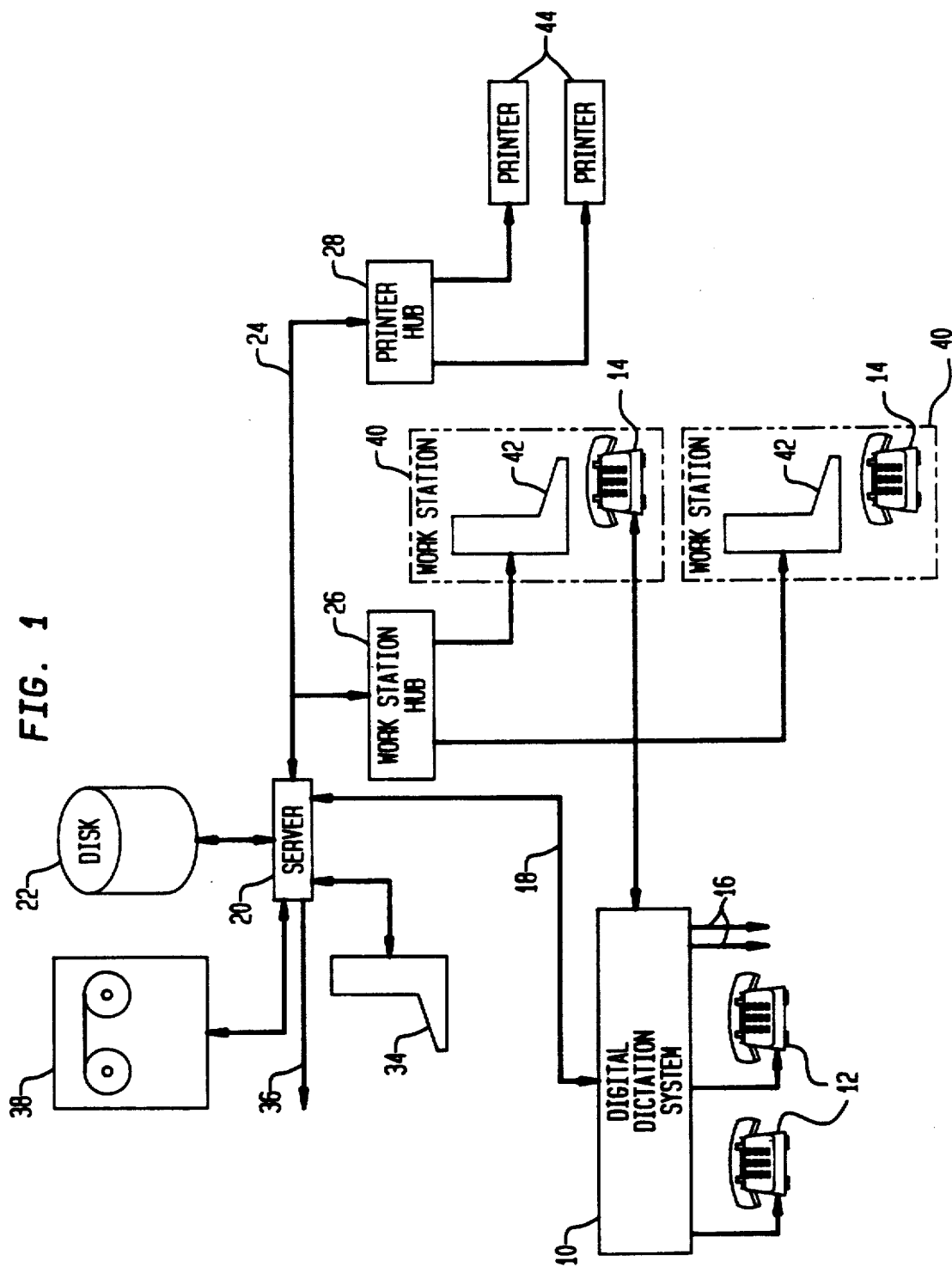
FIG. 1 shows a schematic block diagram of a system in accordance with the subject invention.

FIG. 1 shows a schematic block diagram of a system in accordance with the subject invention. Digital dictation system 10 is substantially a conventional system such as the DX 2000 or DX 7000 marketed by the assignee of the subject Application. Such systems are described in the commonly assigned, co-pending U.S. Pat. application Ser. No. 031,304; for: Digital Dictation System; filed: Feb. 10, 1987, which is hereby incorporated by reference. Dictation system 10 receives dictation jobs over conventional dictation terminals 12 which are telephone-like devices for the input of audio signals and which include a DTMF keypad for the input of control signals. The dictation jobs are stored in the form of voice files of digitized audio signals and output over conventional transcription terminals 14. Dictation system 10 also includes optional inputs from the telephone network over lines 16 for off-site dictation.

The function and operation of digital dictation system 10 is essentially conventional to input, edit, store, and output for transcription voice files of dictation jobs, and a further description of these functions is not believed necessary for an understanding of the subject invention.

Dictation system 10 is connected by communications link 18 to data base server 20. Communications link 18a substantially conventional communications link by which dictation system 10 transmits all, or appropriate portions, of the job record to server 20 when any of the following events relating to a dictation job occur.
1. A dictator compiles a dictation job.
2. A dictation job is assigned to a transcriptionist.
3. A transcriptionist commences transcribing a job.
4. A transcriptionist signs off a job.
5. A job is reviewed by the dictator or another party having access to the voice files on dictation system 10.
6. A voice file is purged from system 10.

Server 20 is a database server which provides database management for a medical records database stored on disk unit 22. It controls and manages all access to the system database. Preferably, server 20 will include a Texas Instruments System 1000 Series computer which runs substantially conventional database management software such as "INTERMEX", produced by Informex Software, Inc. to implement applications as described further below. Server 20 communicates over input/output link 24 with work station hub 26 and printer hub 28.

Server 20 also communicates with administrative work station 34, through which a system operator may enter requests for services such as updating of patient and physician data files in the system database, communication of information in the patient or physician data files, or of reports generated by server 20; and to other information management systems over conventional communications link 36, and the transfer and retrieval of data files to and from archival storage unit 38. Each of these functions is well known in the art of database management, and need not be discussed further here for an understanding of the subject invention.

Returning to work station hub 26, a conventional interface is provided to work stations 40 through word processors 42. Preferably, word processors 42 include a conventional microcomputer such as Texas Instruments 955 Workstation running substantially conventional text processing software. As can be seen from FIG. 1, work stations 40 also include transcription terminals 14 connected to dictation system 10. Hub 26 provides a substantially conventional communications link between word processor 42 and server 20. This communication is an important feature of the subject invention since, as will be described further below, it provides heretofore unknown advantages in the transcription of reports intended for medical, or other records systems.

Turning to printer hub 28, a conventional communications link to conventional printers 44 is provided for the generation of hard copy reports on request. A further description of the operation of printers 44 is not believed necessary for an understanding of the subject invention.

Figure 2B:
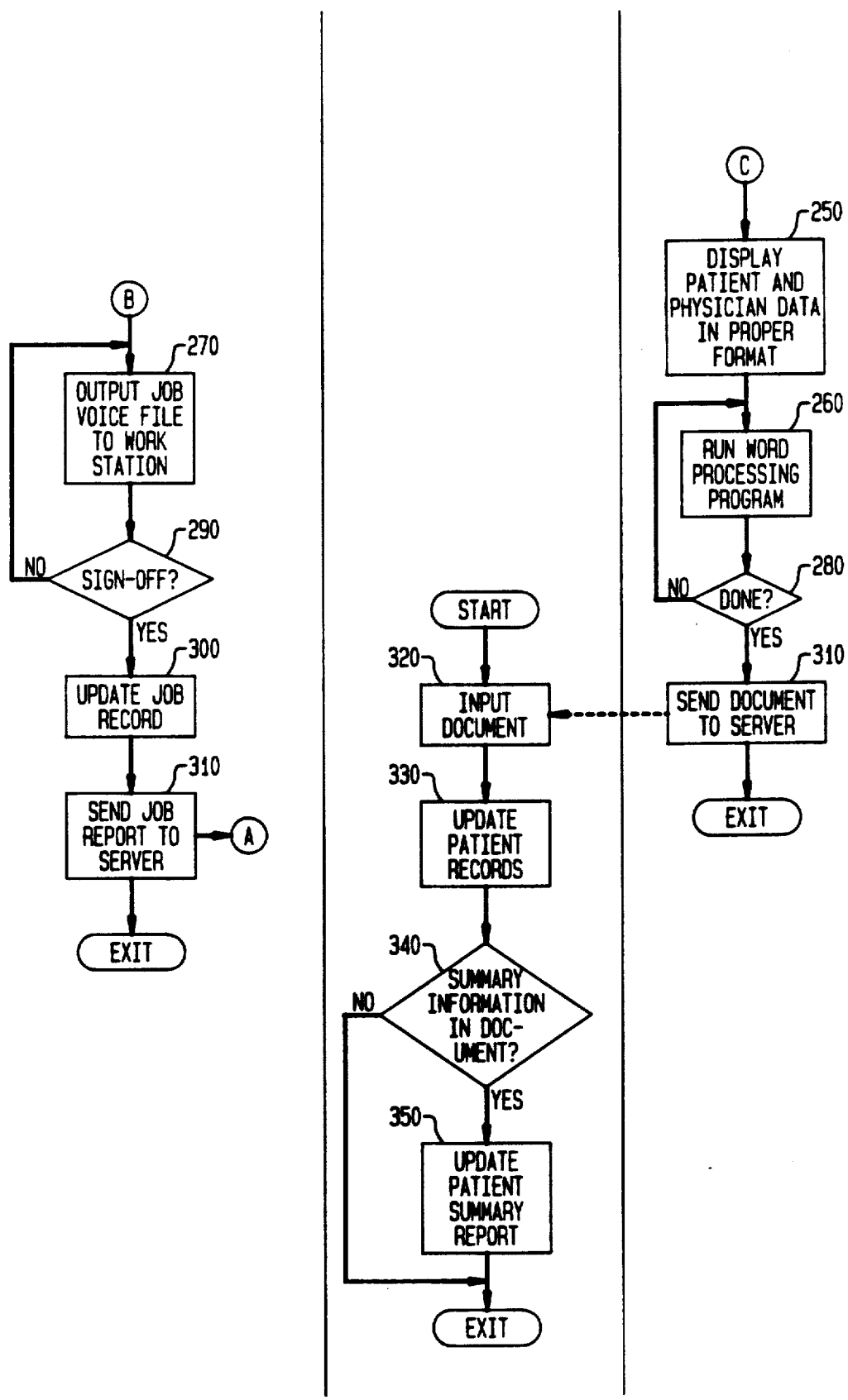

FIG. 2A and 2B show a flow chart of the concurrent operation of the operation of dictation system 10, server 20, and word processors 42 during the creation of a dictation job representing a medical report, and the corresponding updating of the system database. At 100 a dictator (e.g. a physician) logs on to provide his or her identification in a conventional manner and inputs information for the job record using the DTMF keypad of dictation units 12 or a telephone connected to inputs 16. At 110 dictation system 10 records the dictation job as a digital voice file in a conventional manner. Once the dictation job is completed, at 120 system 10 sends the job record to server 20 at A.

As indicated above, the job record is a data file maintained by system 10 reflecting information about a dictation job and is updated periodically as events occur. Preferably, job records will include the following information.

| | |
|---|---|
| 1. Job ID | Assigned by System 10. |
| 2. Physician ID | Entered by Physician During Log On. |
| 3. Report Type | Entered by Physician |
| 4. Patient ID | Entered by Physician |
| 5. Transcription Work Station ID | Assigned by System 10 |
| 6. Date/Time of Creation | Determined by System 10. |
| 7. Length of Dictation | Calculated by System 10 |

As the voice file for the dictation job is accessed, additional information is captured and added to the job record. Such information includes the following.

| | |
|---|---|
| 8. Transcriptionist ID | Entered by the Transcriptionist During Log On. |
| 9. Transcriptionist Station ID | Assigned by System 10. |
| 10. Date/Time Of Assignment | Determined by System 10. |
| 11. Date/Time Of Sign Off by Transcriptionist | Determined by System 10. |
| 12. Turnaround, total | Determined by System 10. |
| 13. Turnaround, working time | Determined by System 10. |
| 14. Date/Time of Review | Determined by System 10. |
| 15. Reviewer ID | Entered by Reviewer during |

-continued

Log On.

(By "review" herein is meant access by the dictator or other party having access to system 10 for the purpose of audio access to the voice file of a dictation job. Such review access is conventionally provided by digital dictation systems in order that, for example, an attending physician may obtain the results of the report of a specialist without waiting for that report to be transcribed. Further description of the review function is not believed necessary for an understanding of the subject invention.)

By transmission of the job record from dictation system 10 to server 20, a file may be maintained within the system database of the status of any medical report at all times from its initial dictation through transcription and incorporation into the system database. Further information from the job record is used by server 20 to facilitate management of the system database and the transcription of the voice files corresponding to dictation jobs representing various medical reports.

Returning to FIG. 2, at 140 server 20 inputs a job record at A and at 150 updates the patient records to reflect the present status of the dictation jobs and corresponding medical report.

At 160 dictation system 10 assigns a transcription priority in accordance with a predetermined priority algorithm in a conventional manner well understood by those skilled in the art. At 170 system 10 loops until a transcriptionist is available, and at 180 system 10 assigns the dictation job to a transcription work station. At 190 dictation system 10 sends the job record, updated to reflect the assignment to the selected transcription work station to server 20.

At 200 server 20 receives the job record and at 210 server 20 gets the appropriate patient and physician data (e.g. patient name and social security number, etc., physician name and ID number, etc.) for the particular report type as identified in the job record, and at 220 server 20 sends this data and the report type to the identified one of work stations 40.

At 230 dictation system 10 loops until the transcriptionist logs on and enters his or her ID.

At 240 word processor 42 receives the patient and physician data and the identification of the report type and at 250 word processor 42 uses the received report type to retrieve information identifying the proper format for the identified report type from a file of report formats stored locally at word processor 42, and merges the patient and physician data with the identified format and displays the merged information. Thus, the initially displayed report form will include necessary information which is already in the system database; relieving the transcriptionist of the need to transcribe that information, and the dictator of the need to originally provide it.

As can be seen from the above description, it is preferable in the subject invention that word processors 42 store data files of formats for each report type to be processed by the system. (Word processor 42 may also store data files duplicating the data files in server 20 used to identify the patient and physician information to be included in each report type so that word processor 42 can properly identify the report format and the information to be merged with that format.) However, it is also within the contemplation of the subject invention that the report formats could be maintained by server 20 and the merged information transmitted to word processor 42, avoiding the need and expense of maintaining storage for these files at each work station 40.

Continuing, at 260 word processor 42 would then run its word processing program. At this time the transcriptionist would sign-on to dictation system 10 through transcription unit 14 in a conventional manner.

At 265 dictation system 10 would respond to sign-on by the transcriptionist to update the job record and send it to server 20 at A. Server 20 would then update the patient records again to reflect the current status of the corresponding medical report. At 270 dictation system 10 would output the dictation job voice file to the selected one of work stations 40 in a conventional manner for transcription. At this point, the transcriptionist would transcribe the voice file into the displayed format in a conventional manner, using word processor 42 to create the text and transcription unit 14 to access the voice file. Word processor 42 loops through 280 while dictation system 10 loops through 290 until the transcriptionist is satisfied that the voice file has been properly and accurately transcribed into the display format. At this time the transcriptionist would sign-off again using the DTMF keypad of transcription unit 14. Also at this time the transcriptionist would signal server 20 that transcription was completed through word processor 42.

As will be clear to those skilled in the art from the above description, it is preferable that the transcriptionist sign-off through the DTMF keypad of unit 14 and signal to server 20 through word processor 42 in order to minimize the necessary software changes to the existing communications routines of dictation system 10 and the word processing software of word processor 42. However, it is also within the contemplation of the subject invention that the transcriptionist indicate that transcription is completed (i.e. sign-off) only to either dictation system 10 or server 20 with the other system being notified through communications link 18. The necessary modifications to the communication software would be readily apparent to those skilled in the art.

At 300 dictation system 10 again updates the job record.

At 310 word processor 42 transmits the completed document (i.e. the format and merged information together with the transcribed voice file) to server 20 at A.

At 320 server 20 inputs the document and at 330 server 20 updates the patient records by incorporating the document.

At 340 server 20 then determines if the report type represented by the document includes information to be summarized in the patient's summary report. If so, at 350 server 20 updates the patient's summary report with information selected from the document in accordance with the report definition files for that report type. The summary report may be maintained on the system either logically or actually. That is, by maintaining a logical record of those portions of documents which comprise the summary report, or by maintaining the summary report as a separate document. Preferably the summary report is maintained logically and compiled each time it is accessed, and converted to a separate document if and when it is edited so that it differs from the logical summary report.

For reasons of clarity, the above description has been provided in terms of a single report and the transcription of its corresponding voice file. However, those skilled in the art will recognize that known digital dictation systems such as system 10 have the capability to process a plurality of dictation jobs concurrently, and that known database management systems also have the capability to concurrently process a number of tasks. Accordingly, it is within the contemplation of the subject invention that the system process a plurality of dictation jobs and other tasks concurrently. The necessary programming techniques for such concurrent processing are well known and well within the skill of those in the art and need not be discussed further here for an understanding of the subject invention. Limitations on the number of tasks that can be processed concurrently are essentially economic in nature and are determined by the storage capacity and processing power of dictation system 10 and server 20 and by the number of input/output ports of various types which can be afforded.

Figure 3A:
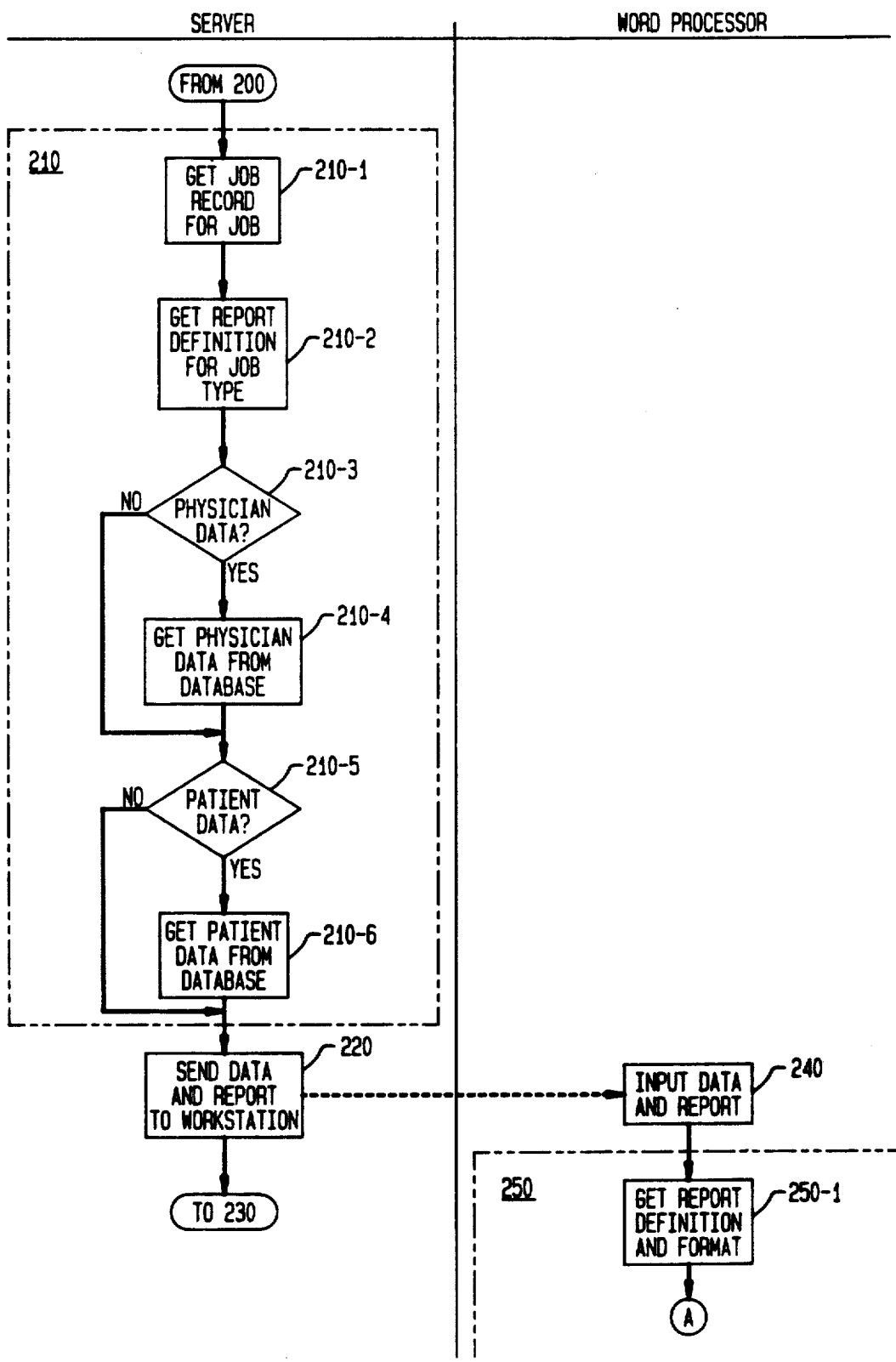
FIG. 3A and 3B show a more detailed flow chart of a portion of the operation of the data processing system and one of the word processing system incorporated in the system of FIG. 1.
Figure 3B:
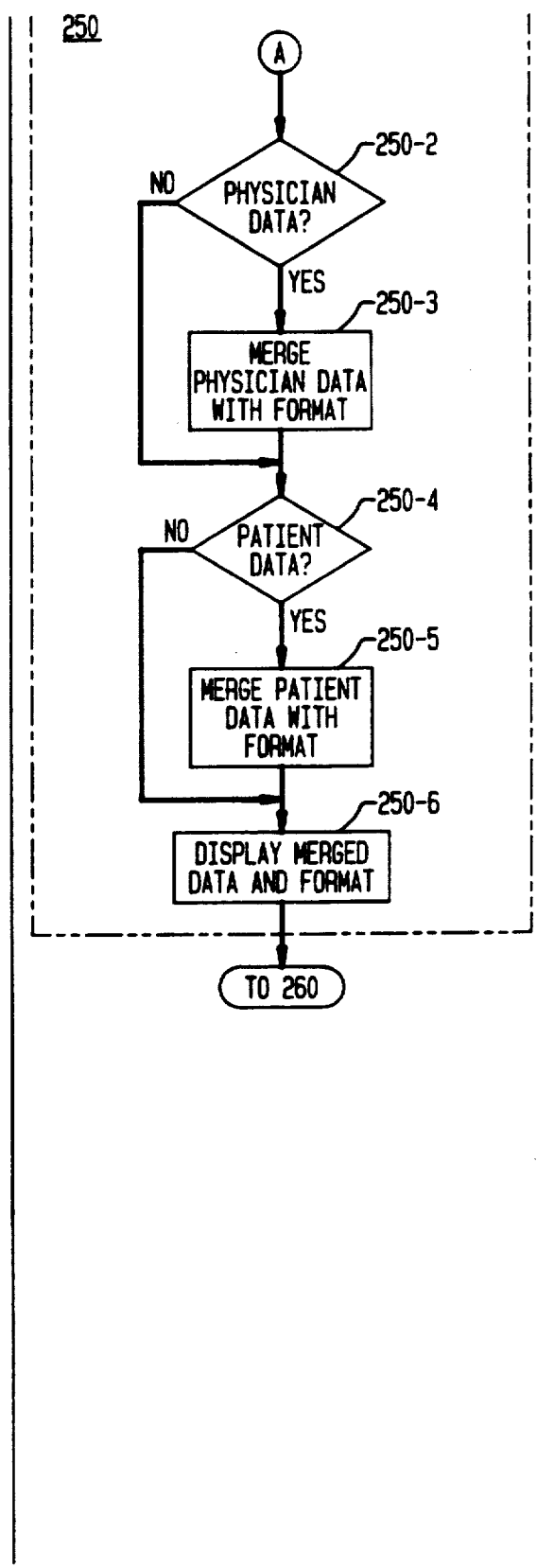

FIG. 3A and 3B show a more detailed description of the operation of server 20 and word processor 42 in initializing a report for transcription. Within block 210 of FIG. 2 at 210-1 server 20 gets the job record for the job and determines the report type. At 210-2 server 20 gets the report definition for the identified report type, and at 210-3 determines if any physician data stored in the physician data files is needed for that report type. If there is, at 210-4 server 20 gets that physician data from the physician data files. In either case, at 210-5 server 20 determines if patient data is needed for that report type and, if so, gets the patient data at 210-6, and in either case, goes to block 220, as shown in FIG. 2, to send the data and report type to word processor 42 at block 240. In block 250 at 250-1 word processor 42 gets a duplicate report definition and format type for the identified report type from local data files. At 250-2 word processor 42 determines if that report type includes any physician data and, if so, at 250-3 merges the received physician data with the appropriate format. In either event, at 250-4 word processor 42 then determines if any patient data is necessary for that report type, and if so, merges the received patient with the appropriate format at 250-5. Then at 250-6 the merged data and format are displayed in a conventional manner on, for example, a CRT display.

Figure 4:
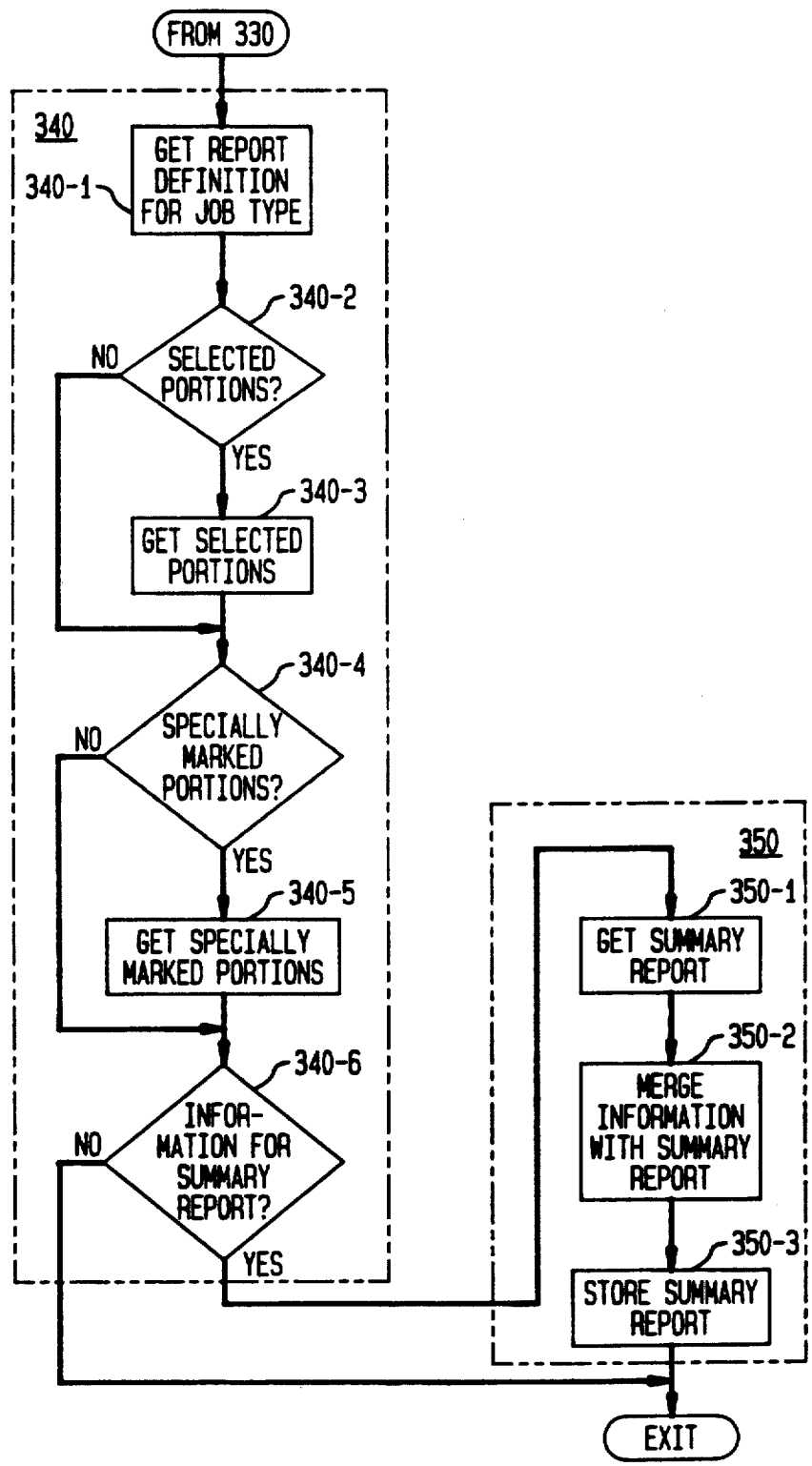
FIG. 4 shows a more detailed flow chart of the operation of a data processing system incorporated in the system of FIG. 1.

FIG. 4 shows a flow chart in more detail of the operation of server 20 in updating a patient's summary report. In decision block 340, at 340-1 server 20 first gets the report definition for the identified report type. At 340-2 server 20 determines if selected portions of the document are defined as part of the summary report, and, if so, gets those portions from the document filed in the patient's records.

It is also within the contemplation of the subject invention that portions of a report may be identified by a system user, such as a para-professional reviewing the document, for incorporation in the summary report.

It is also within the contemplation of the subject invention that a dictator may wish to include comments for the patient's summary report in addition to any portions of a medical report which are defined as part of the patient's summary report. Accordingly, at 340-4 server 20 determines if the document contains any "comments". The dictator may direct the transcriptionist to specially mark portions of a transcribed document as "comments" by inserting control characters in the transcribed text. For example, comments may be distinguished from other text material by being set off by characters otherwise not normally used in the report, such as angled brackets or asterisks. At 340-5 server 20 then gets any "comments" which are included in the document, and at 340-6 determines if the document contains any information for the patient's summary. If so, the system continues to block 350, and at 350-1 gets the patient's summary report, at 350-2 server 20 merges the information identified at 340 into the summary report, and at 350-3 stores the summary report in the patient's medical records.

As indicated, such a summary report is highly advantageous to a hospital since the patient's summary report is essentially always current and may be rapidly generated when the patient is discharged. Further, even in the event that some medical reports have been dictated, but not yet transcribed, the system administrator may readily request dictation system 10 to increase the priority of these reports to expedite preparation of the patient's summary report. This summary report may then be sent to the attending physician for review, additions and changes, and signature in order to generate a patient discharge summary.

The patient discharge summary includes information required by providers of third party coverage before they will provide reimbursement, for example, primary and secondary diagnosis, procedures carried out, length of stay, etc. In the present era of high expense and tight cost constraints for hospitals, the ability to expedite the generation of the patient discharge summary by providing the attending physician with an accurate summary of the patient's medical records is highly advantageous.

Figure 5:
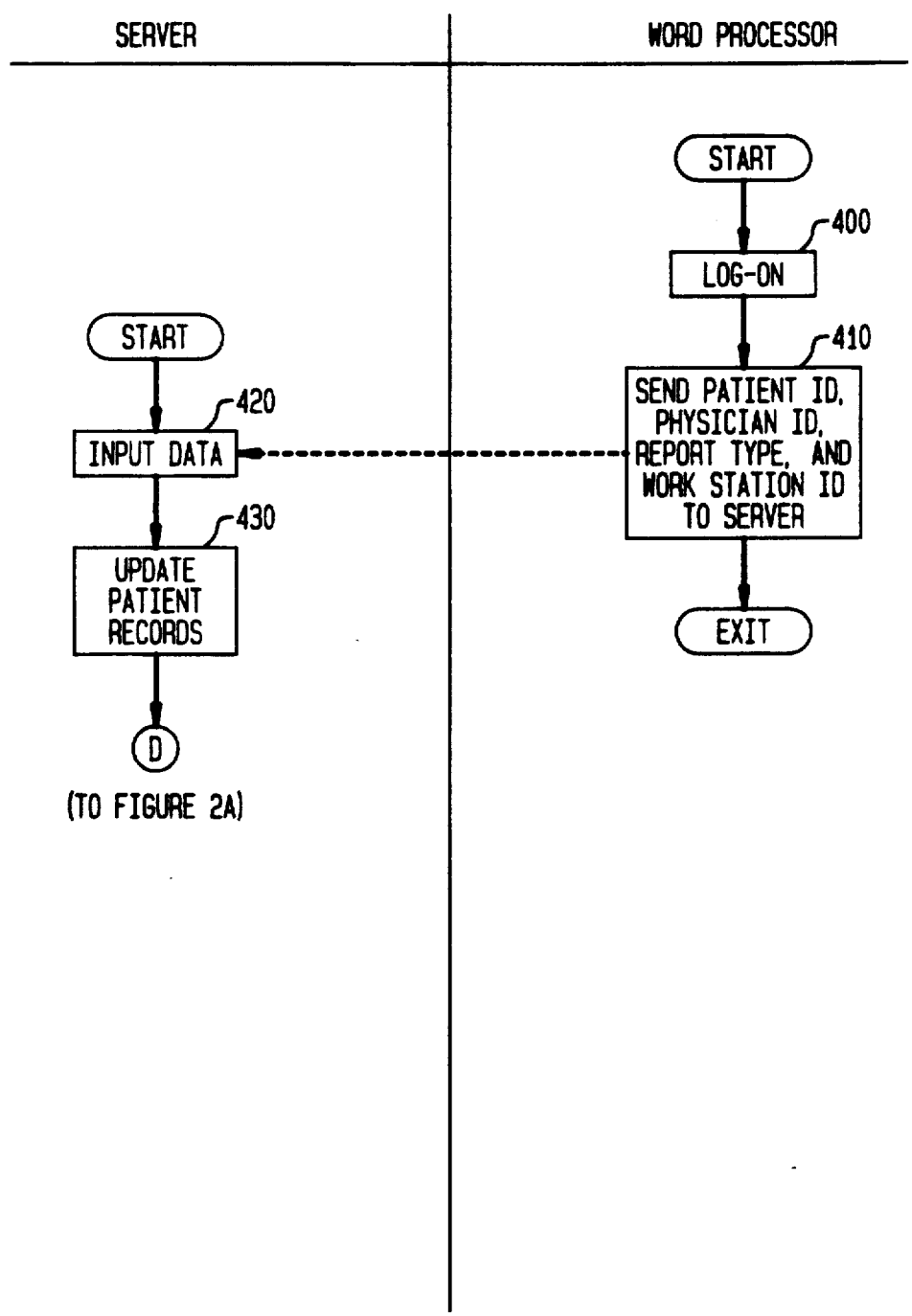
FIG. 5 shows a flow chart of the operation and interaction of various components of the system of FIG. 1 during an alternate mode of creation of the report.

The above description comprises an on-line, or system, mode of operation of the subject invention wherein reports are generated through dictation system 10. However, it is also within the contemplation of the subject invention that reports may be initially generated off-line, for example, using portable dictation equipment or in written form. FIG. 5 thus shows the operation of the system of the subject invention in an off-line mode. At 400 a transcriptionist logs-on to one of word processors 42 at one of work stations 40 in the off-line mode. In this mode, at 410 the transcriptionist transmits the patient ID, physician ID, report type, work station ID, etc. to server 20 through word processor 42. At 420 server 20 receives the data, and at 430 updates the patient records.

Server 20 then goes to D, shown in FIG. 2 and continues operation as described above; except of course that the transcriptionist will neither sign-on nor sign-off to dictation station 10.

It is also within the contemplation of the subject invention that word processors 42 may be used in a wholly conventional manner as stand alone word processors.

The above descriptions of preferred embodiments of the subject invention have been provided by way of illustration only, and those skilled in the art will readily recognize numerous other embodiments of the subject invention from the detailed description and the attached drawings. Accordingly, limitations on the subject invention are to be found only in the claims set forth below.

What is claimed is:

1. A system comprising:
   a) a dictation means for input, storage, and output of dictation jobs corresponding to selected report types relating to selected subjects;
   b) transcription means including a display for transcription of said dictation jobs into documents, said documents comprising reports on said selected subjects;

c) means for storing information defining formats corresponding to said report types;

d) first communications means for transmitting information identifying said report types corresponding to said dictation jobs from said dictation means to said storing means; and, e) second communication means for transmitting said information defining formats from said storing means to said display; wherein f) said storing means responds to said information identifying said report types to select particular ones of said formats and information defining said selected formats is transmitted to said display through said second communications means; and, g) said display responds to said information defining said selected formats to display said defined formats; whereby a transcriptionist can transcribe said dictation jobs into said documents, said documents having said selected formats.

2. A system as described in claim 1 wherein said documents are medical reports and said selected subjects are patients.

3. A system as described in claim 2 further comprising database server means for managing a database of information relating to said selected subjects, said server means receiving said documents from said transcription means for incorporation in said database.

4. A system as described in claim 3 wherein said transcription means comprises said storing means.

5. A system as described in claim 4 wherein said first communications means comprises said server means, said server means receiving said information identifying said report types from said dictation means, retrieving additional, supplemental information pertaining to said report types for said selected subjects and transmitting said retrieved information to said transcription means with said information identifying said report types, said transcription means retrieving said information defining said selected formats in accordance with said information identifying said report types and merging said retrieved report types and additional, supplemental information with said information defining said selected formats, and displaying said merged information.

6. A system as described in claim 3 wherein said first communications means comprises said server means, said storing means responding to said server means; said server means receiving said information identifying said report types from said dictation means, retrieving information pertaining to said report types from said database, retrieving said information defining said selected formats from said storing means, in accordance with said identifying information merging said retrieved information and said information said selected formats and and transmitting said merged information to said display through said second communications means; said display displaying said merged information.

7. A system as described in claim 1 further comprising database server means for managing a database of information relating to said selected subjects, said server means receiving said documents from said transcription means for incorporation in said database.

8. A system as described in claim 7 wherein said transcription means comprises said storing means.

9. A system as described in claim 8 wherein said first communications means comprises said server means, said server means receiving said information identifying said report types from said dictation means, retrieving additional, supplemental information pertaining to said report types for said selected subjects and transmitting said retrieved information and said identifying information to said transcription means, said transcription means retrieving said information defining said selected formats from said storage means in accordance with said identifying information and merging said retrieved report types and additional supplemental information with said information defining said selected formats, and displaying said merged information on said display.

10. A system as described in claim 7 wherein said first communications means comprises said server means, said storing means responding to said server means; said server means receiving said information identifying said report types from said dictation means, retrieving information pertaining to said report types from said database, retrieving said information defining said selected formats from said storing means, in accordance with said identifying information merging said retrieved information and said information defining said selected formats and and transmitting said merged information to said display through said second communications means; said display displaying said merged information.

11. An apparatus for facilitating transcription of dictation jobs corresponding to selected report types relating to selected subjects, said dictation jobs being stored on a dictation system and transcribed on a transcription system in response to information from said apparatus, said transcription system including a display, said system comprising:

a) means for storing information defining formats corresponding to said report types;

b) first communications means for transmitting information identifying said report types corresponding to said dictation jobs from said dictation system to said sorting means; and, c) said storing means responds to said information identifying said report types to select particular ones of said corresponding formats and to transmit information defining said selected formats to said transcription system; whereby, d) said transcription system responds to said information defining said selected formats to display said selected formats, whereby a transcriptionist transcribes said dictation jobs into documents having said selected formats.

* * * * *